(12) United States Patent
Shah et al.

(10) Patent No.: US 9,172,586 B1
(45) Date of Patent: Oct. 27, 2015

(54) METHOD AND SYSTEM FOR WRITING TAG AND DATA

(71) Applicant: QLOGIC, Corporation, Aliso Viejo, CA (US)

(72) Inventors: Shishir Shah, Irvine, CA (US); Ajmer Singh, Rancho Santa Margarita, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 215 days.

(21) Appl. No.: 13/902,427

(22) Filed: May 24, 2013

Related U.S. Application Data

(60) Provisional application No. 61/660,604, filed on Jun. 15, 2012, provisional application No. 61/697,680, filed on Sep. 6, 2012, provisional application No. 61/703,193, filed on Sep. 19, 2012.

(51) Int. Cl.
| | |
|---|---|
| *G06F 9/50* | (2006.01) |
| *G06F 13/28* | (2006.01) |
| *G06F 13/00* | (2006.01) |
| *H04L 29/08* | (2006.01) |

(52) U.S. Cl.
CPC ............................... *H04L 29/08549* (2013.01)

(58) Field of Classification Search
CPC .................................. G06F 9/505; G06F 13/28
USPC .............. 709/212; 710/22, 107; 711/118, 130
See application file for complete search history.

(56) References Cited

U.S. PATENT DOCUMENTS

| | | | |
|---|---|---|---|
| 8,510,265 B1 * | 8/2013 | Boone et al. .................. 707/609 |
| 8,863,145 B2 * | 10/2014 | Watanabe et al. ............. 718/105 |
| 2006/0031653 A1 * | 2/2006 | Todd et al. ..................... 711/170 |
| 2009/0187713 A1 * | 7/2009 | Zedlewski et al. ............ 711/130 |

OTHER PUBLICATIONS

"VMWare Storage Best Practices"—VMWare, Apr. 2011 https://www.vmware.com/files/pdf/support/landing_pages/Virtual-Support-Day-Storage-Best-Practices-June-2012.pdf.*

* cited by examiner

*Primary Examiner* — Randy Scott
(74) *Attorney, Agent, or Firm* — Klein, O'Neill & Singh, LLP

(57) ABSTRACT

A computing device having a processor for executing an application for generating an input/output (I/O) request for writing data to a logical object presented to the application; and a device interfacing with the computing device having a processor for generating a single I/O command for writing data in response to the I/O request and writing a tag that is associated with the data are provided. The tag includes an identifier for the logical object used for writing the data at a storage device and a logical address for a location at the storage device where the data is written. Furthermore, the tag is stored at a memory device of the device, while the data is stored at a local caching device, at a storage area network (SAN) storage device or both.

18 Claims, 5 Drawing Sheets

| Bit<br>Byte | 7 | 6 | 5 | 4 | 3 | 2 | 1 | 0 |
|---|---|---|---|---|---|---|---|---|
| 0 | Operation Code (C8h) | | | | | | | |
| 1 | Reserved | | | | | Seg2AddrFmt | Seg1AddrFmt | Direction |
| 2 | (MSB) | | | | | | | |
| 3 | LUN2 ~ 308 | | | | | | | (LSB) |
| 4 | (MSB) | | | | | | | |
| 5 | | | | | | | | |
| 6 | Data Segment1 Address ~ 310 | | | | | | | |
| 7 | | | | | | | | (LSB) |
| 8 | (MSB) | | | | | | | |
| 9 | Data Segment1 Length ~ 312 | | | | | | | (LSB) |
| 10 | (MSB) | | | | | | | |
| 11 | | | | | | | | |
| 12 | Data Segment2 Address ~ 314 | | | | | | | |
| 13 | | | | | | | | (LSB) |
| 14 | (MSB) | | | | | | | |
| 15 | Data Segment2 Length ~ 316 | | | | | | | (LSB) |

FIG. 3

METHOD AND SYSTEM FOR WRITING TAG AND DATA

CROSS REFERENCE TO RELATED APPLICATIONS

This patent application claims the benefit under 35 U.S.C. §119(e) of U.S. Provisional Application Ser. No. 61/660,604, filed on Jun. 15, 2012, U.S. Provisional Application Ser. No. 61/697,680, filed on Sep. 6, 2012 and U.S. Provisional Application Ser. No. 61/703,193 filed on Sep. 19, 2012. The disclosures of the aforementioned provisional applications are incorporated herein in their entireties.

TECHNICAL FIELD

The present disclosure relates to network communications and devices.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use the mass storage devices to store data. Data centers are commonly used to store large amount of data for computing devices. Different storage options are available for computing devices to store data and retrieve data. For example, direct-attached storage (DAS), network attached storage (NAS) and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Continuous efforts are being made to better provide access to storage systems and improve how data is stored and retrieved in a network environment having a plurality of computing devices.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts:

FIG. 3 shows an example of a CDB format, according to one embodiment.

DETAILED DESCRIPTION

Figure 1A:
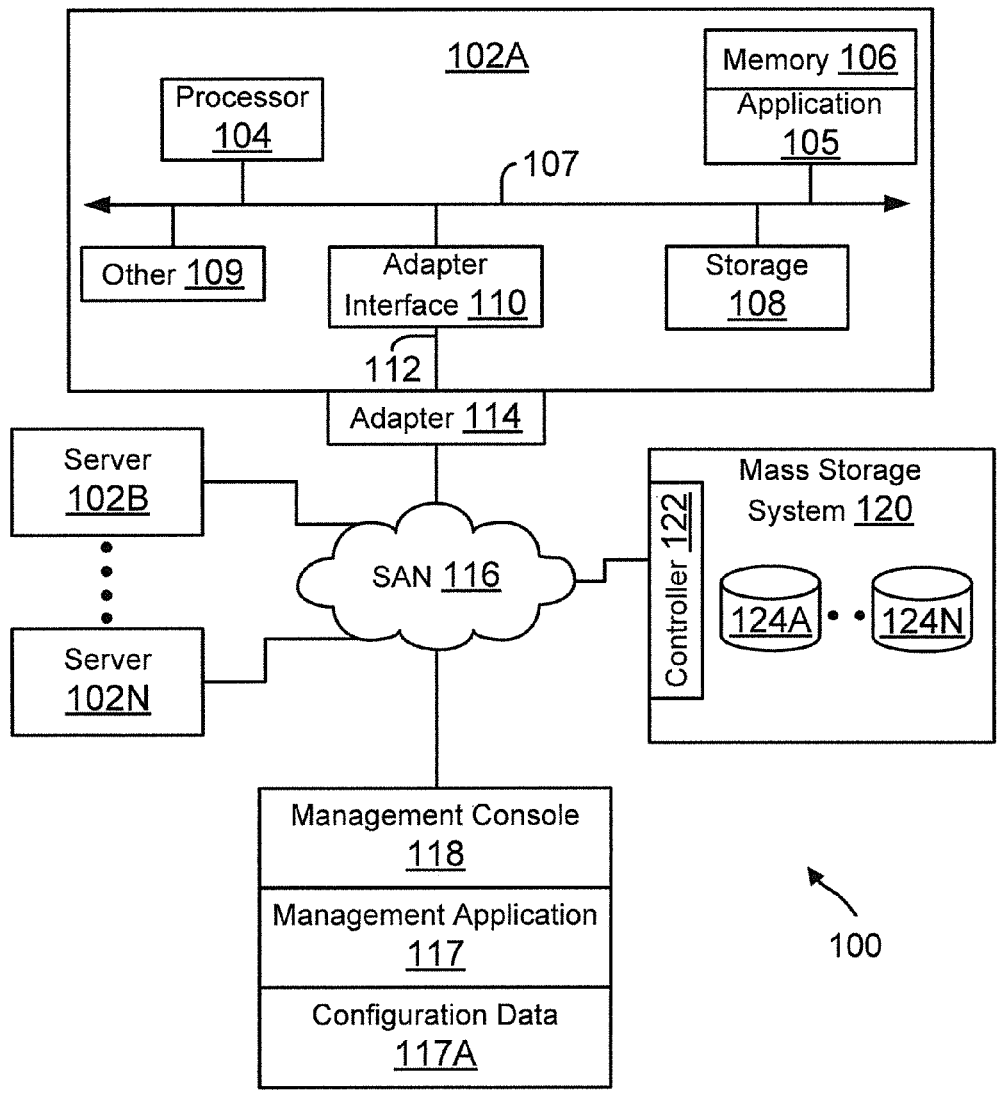
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer" "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a storage area network (SAN) based storage device and another adapter operating within a cluster is provided. The adapter includes a processor executing instructions for managing a local storage device that is configured to operate as a caching device for a computing device. The adapter operates as a host bus adapter and a storage controller for managing storage space at the local storage device and the SAN-based storage device.

System 100:

FIG. 1A is a block diagram of a system 100 configured for use with the present embodiments. System 100 may include a plurality of computing systems 102A-102N (may also be referred to as server(s) 102 or host system 102), each coupled to an adapter 114 (also referred to as an intelligent storage adapter (ISA) 114) that interfaces with other devices and ISAs.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The computing system 102A may further include a storage device 108 (or local storage device 108), which may be for example a hard disk, a CD-ROM, a non-volatile memory device (flash or memory stick) or any other storage device for storing structured or unstructured data. Storage 108 may store operating system program files (or data containers), application program files, for example, email applications, database applications, management applications, and other application files. Some of these files are stored on storage 108 using an installation program. For example, the processor 104 may execute computer-executable process steps of an installation program so that the processor 104 can properly execute the application program.

In one embodiment, storage device 108 may be a solid state storage device (may also be referred to herein as SSD 108) and used by host 102A as a caching device for storing information. SSDs may be used by servers that need to store large amounts of data. ISA 114 described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one embodiment, processor 104 may execute an application 105 for performing certain functions. For example, application 105 may be a database application, a virtual machine executed in a virtual environment (provided by VMWare Corporation, Microsoft Corporation or any other entity) electronic email application (for example, Microsoft Exchange) or any other application type. Application 105 may issue read and write requests that are processed by ISA 114, as described below in more detail The computing system 102A also includes other devices and interfaces 109, which may include a display device interface, a keyboard interface, a pointing device interface and others. The details of these components are not germane to the inventive embodiments.

ISA 114 may be configured to handle both network and storage traffic while interfacing with other elements. In one embodiment, as described below in detail, ISA 114 may be configured to provide the functionality of a host bus adapter (HBA) by providing connectivity to SAN (storage area network) based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (may also be referred to as "FC") is a common technology used in SANs. Fibre Channel provides a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices typically include a node port or "N_Port" that manages Fabric connections. The N_port establishes a connection to a Fabric element (e.g., a switch) having a fabric port (F_port).

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one embodiment, ISA 114 can be configured to operate as a FCOE adapter. Those of ordinary skill in the art will appreciate, however, that the present embodiments are not limited to any particular protocol.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers.

iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114 may operate as an initiator as well as a target for responding to input/output (referred to as I/O or "IO") requests for reading and writing information at storage devices.

Storage space at a storage device (local or SAN-based) is typically presented to application 105 as a logical entity referred to as a logical unit number (LUN). Each LUN is uniquely identified by an identifier (LUN ID) (may also be referred to as a logical object identifier) and is associated with physical storage space. A LUN is typically divided into logical block addresses (LBAs) that are used by application 105 to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114 may be referred to as a "cache" LUN. A cache LUN may be used to cache data stored at a SAN LUN or another data LUN. In one embodiment, the cache LUN is managed by ISA 114 and may not be visible to application 105.

Referring back to FIG. 1A, computing system 102 uses an adapter interface 110 to communicate with ISA 114 via a link 112. In one embodiment, link 112 may be a PCI-Express link or any other interconnect type. The adaptive embodiments disclosed herein are not limited to any particular link type.

ISA 114 may communicate and interface with local storage 108 and a mass storage system 120 via a SAN 116 that may include one or more switch (may be referred to as fabric switch). The mass storage system 120 may include a plurality of storage devices 124A-124N. Storage space at storage devices 124A-124N may be presented as SAN LUNs to application 105 via SAN 116. Controller 122 of mass storage system 120 may be used to manage storage devices 124A-124N. In one embodiment, controller 122 may include a processor, an ISA 114 and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. A LUN is typically identified by a unique identifier; has a size associated with it that may indicate the amount of storage space that is made available to a computing system and a drive letter that may be used to access the LUN. Permissions associated with a LUN may also be configured using management application 117. The permissions indicate which entities may be allowed to access a LUN to read and/or write information. Management application 117 may store LUN attributes and permissions in a configuration data structure 117A at a storage location.

As mentioned above, computing system 102A may include SSD 108 such that mass storage devices are "closer" to computing system 102A. When SSDs are deployed in computing system 102A, they may be used for caching data that is closest to the applications executed within server 102A. This improves performance from the application's perspective because performance is not limited due to bandwidth limitations of SAN 116 or of controller 122 at the mass storage system 120.

In conventional systems, when data is stored at a SAN LUN, a tag is used for maintaining an association with the stored data and the SAN LUN. The conventional process for storing the data and the tag is as follows: Typically, an application issues a request to write data. An I/O control block (IOCB) is generated and acquired by a conventional adapter. If the adapter has access to local storage, the adapter issues a first I/O request to store the data at the local storage or to a SAN accessible storage device. The adapter then issues a second I/O request to write the tag that is associated with the stored data. Thus, multiple I/Os are used for writing the tag and data. This can become inefficient, especially in an environment where data is extensively cached, for example, in a data center environment used for storing data for social media applications.

In one embodiment, ISA 114 issues a single I/O request for writing both the tag and the data. The process for generating a single I/O is described below in detail with respect to FIGS. 2 and 3.

Figure 1B:
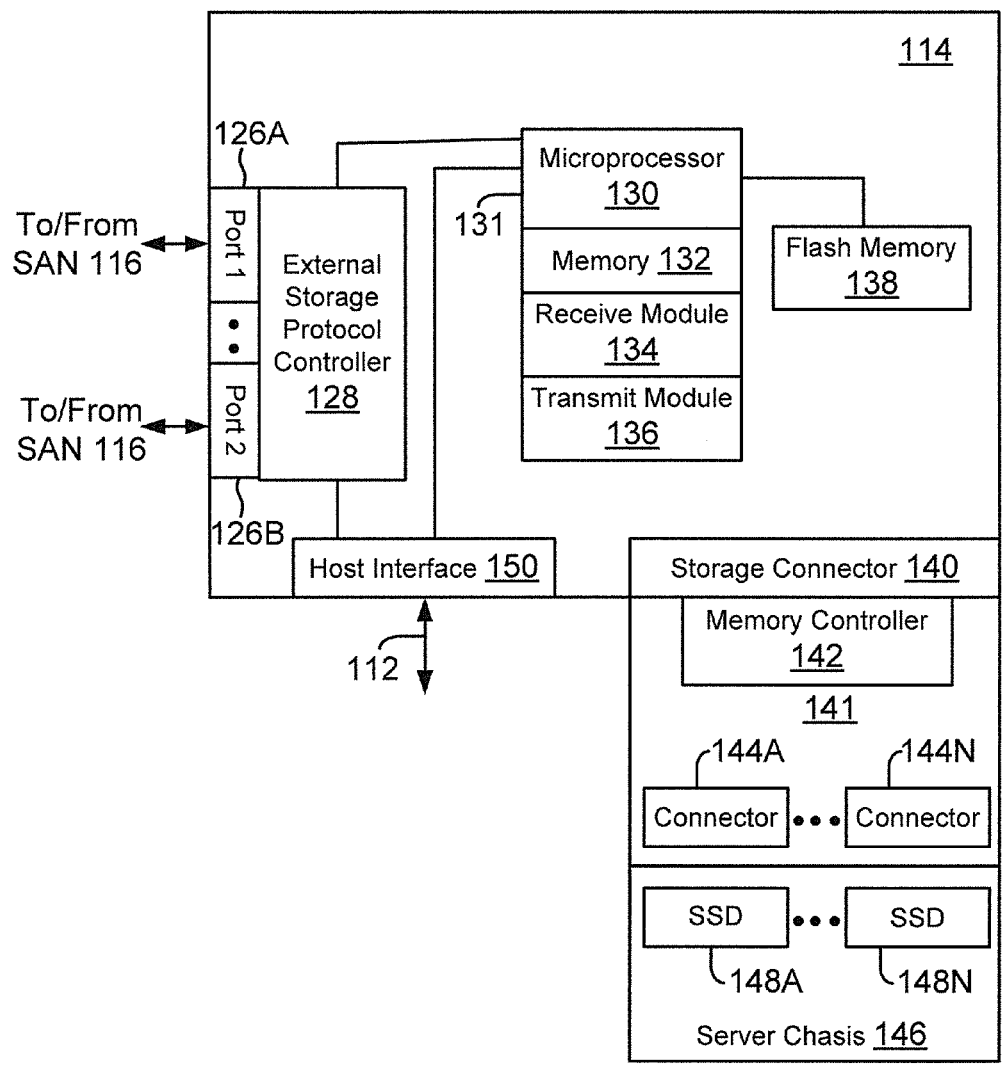
FIG. 1B shows an example of an intelligent storage adapter (ISA)

FIG. 1B shows an example of ISA 114, according to one embodiment. ISA 114 includes a storage protocol controller 128 (shown as "external storage protocol controller") with ports 126A and 126B. The storage protocol controller may be a Fibre Channel controller (or application specific integrated circuit (ASIC)) that is available from QLogic Corporation for interfacing with Fibre Channel based storage devices via ports 126A/126B. Ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC3. FC0 is defined by the Fibre Channel specification as the physical layer, which includes cables (fiber optics, twisted-pair), connectors and others. FC1 layer is defined as the data link layer. This layer implements the 8B/10B encoding and decoding of signals. FC2 layer 49C is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114 also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114 includes a system on chip (SOC) 131 that includes a micro-processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures (for example, 160, FIG. 1C) for ISA 114 for controlling overall ISA 114 operations. Memory 132 may also store instructions for implementing the various embodiments described herein including a caching module 158 (FIG. 1C) that is described below in detail.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114 may also include a non-volatile memory 138 (shown as flash memory) for storing parameters/instructions that may be used by micro-processor 130 for executing the instructions described below in detail. ISA 114 also includes a storage connector 140 that interfaces with another card 141 (may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors 144A-144N. The plurality of connectors 144A-144N are used to plug in SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors.

ISA 114 has SAN connectivity because of ports 126A-126B, similar to a host bus adapter, as mentioned above. The storage protocol controller 128 allows SAN storage based processing. Unlike conventional HBAs, ISA 114 also includes a storage connector 140 that provides local storage solutions via SSDs 148A-148N.

It is noteworthy that ISA 114 may have different configurations for accessing SSDs 148A-148N and the embodiments disclosed herein are not limited to any particular configuration.

Figure 1C:
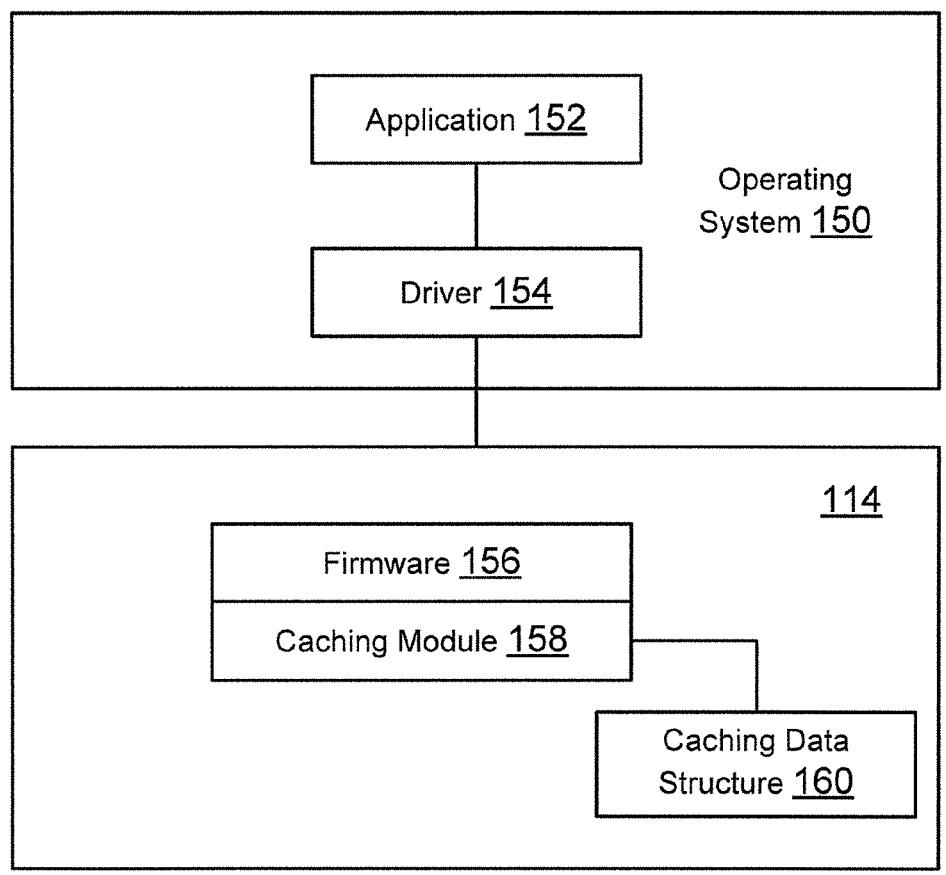
FIG. 1C shows an example of an architecture used by the system of FIG. 1A, according to one embodiment.

FIG. 1C shows an example of an architecture used by system 100 of FIG. 1A. An operating system 150 is executed by processor 104 for controlling the overall operations of host 102A. The operating system 150 may be Windows, Linux, Solaris, Unix based or any other operating system type. The embodiments disclosed herein are not limited to any particular operating system type.

ISA 114 executes firmware instructions 156 to control the overall operations of ISA 114. Firmware 156 includes or interfaces with the caching module 158 that manages caching operations, according to one embodiment. Caching module 158 maintains the caching data structure 160 that is used to store a tag for any data that is stored at a local SSD or SAN storage, as described below in detail.

Figure 2:
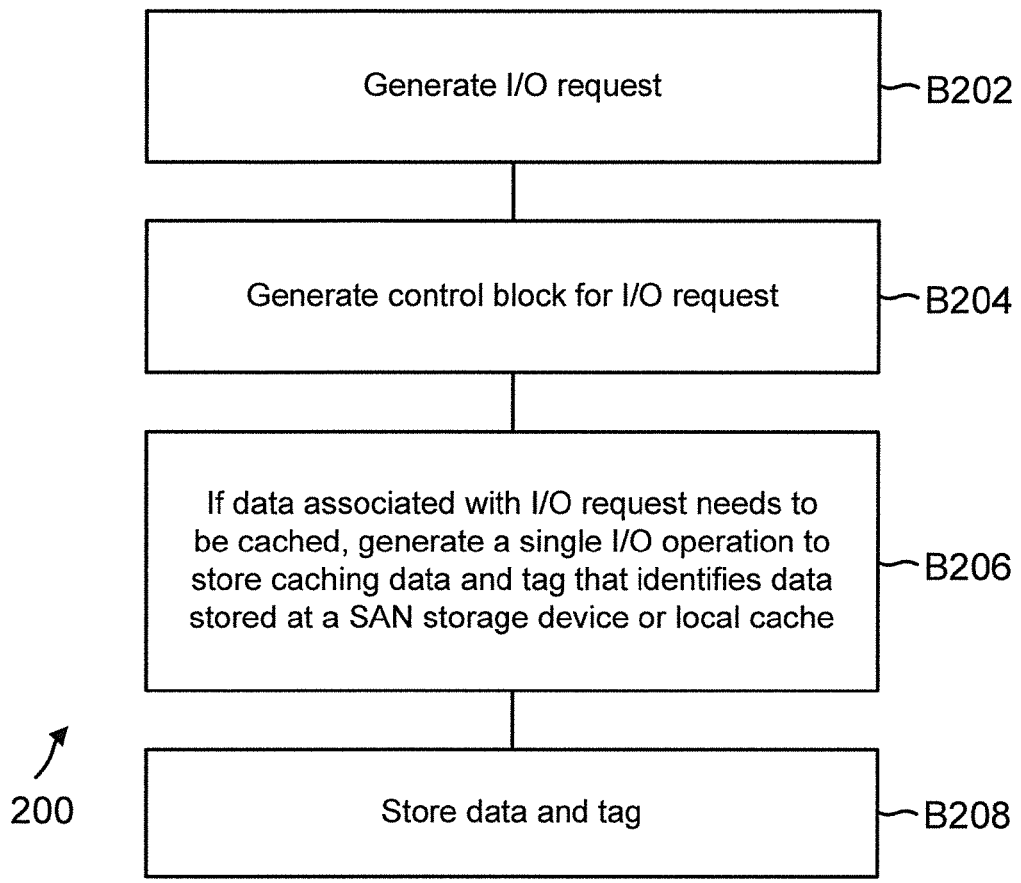
FIG. 2 shows a process flow diagram according to one embodiment of the present disclosure.

FIG. 2 shows a process 200 for managing an I/O write request, according to one embodiment. The process begins in block B202, when an I/O request is generated by application 105. The request is to write data at a storage location. An IOCB for the I/O request is then generated by driver 154 and stored at memory 106. ISA 114 retrieves the IOCB from host memory 106 in block B204.

In block B206, caching module 158 determines if the data associated with the IOCB should be cached at SSD 148A-148N and/or storage devices 148A-148N. If the data is to be cached, then the caching module 158 issues a single I/O request for writing the data and the tag associated with the data. The tag may be stored at a non-volatile memory that is accessible to ISA 114, for example, flash memory 138. The tag includes a LUN identifier that identifies the LUN that stores the data and a LBA associated with the LUN. The tag can be used by ISA 114 to determine the location of the stored data. Thereafter, in block B208, the data associated with the I/O request and the tag associated with the data is stored. The data may be stored at a local cache and/or a storage device that is accessible via SAN 116, for example, storage device 148A-148N. The tag may be stored at the flash memory 138.

In one embodiment, ISA 114 uses a SCSI CDB to issue the I/O request for the tag and data. Typically, an IOCB includes a CDB and a LUN identifier that identifies the LUN where data is to be written. In one embodiment, ISA 114 uses a first segment and a second segment within the CDB. A first segment is used for data that is cached, for example, at a local SSD and stored at a SAN based storage device. The LUN for the first segment is included in the IOCB. The second segment is used for writing the tag. The second segment is also used to store the LUN information for writing the tag, for example, at storage device 138.

An example of such a CDB is provided in FIG. 3 as 300 having a plurality of fields 302-316. In one embodiment, CDB 300 is a Read/Write Data Command that can be used to specify that the target device reads or writes data to given offsets. Two different segments (segment1 and segment2) can be specified, each for a separate LUN. Each segment can be addressed as words (32-bit) or 512-byte logical block address (LBA). The following provides a description of the various fields (or bits) of CDB 300:

Direction 302—The Direction bit 302 is used to indicate the direction of the data transfer for read or write operation. The Direction bit 302 may be set to a first value, for example, 0, to indicate that data transfer is from an initiator/host to a target device. This bit when set to one may be used to indicate that the data transfer is from the target device to the initiator/host.

Seg1AddrFmt 304—Seg1AddrFmt 304 specifies the addressing method for the first segment shown as segment1. This bit may be set to a first value, for example, zero to indicate that the segment1 is addressed as words (for example, as 32-bit words). This bit may be set to 1 to indicate that the segment1 is addressed as 512-byte block.

Seg2AddrFmt 306—Seg2AddrFmt 306 specifies the addressing method for the second segment shown as segment2. This bit may be set to a first value, for example, zero to indicate that the segment2 is addressed as words (for example, as 32-bit words). This bit may be set to 1 to indicate that the segment2 is addressed as 512-byte block.

LUN2 308: LUN2 field 308 (or logical object) specifies the Logical Unit Number for segment2. This provides the LUN information to write the tag at storage device 138.

Data Segment1 Address 310: The Data Segment1 Address field 310 specifies the address of segment1.

Data Segment1 Length 312: The Data Segment1 Length field 312 specifies the length of segment1. If Data Segment 1 Length is zero then no data is transferred for segment 1.

Data Segment2 Address 314: The Data Segment2 Address field 314 specifies the address of segment2.

Data Segment2 Length 316: The Data Segment2 Length field 316 specifies the length of segment2. If Data Segment2 Length is zero then no data is transferred for segment 2.

Using CDB 300 to write data and tag in one I/O request saves time and resources. Multiple I/O are not used to write data and the tag, as performed by conventional systems.

It is noteworthy that although the process and the CDB format are described above with respect to ISA 114, the embodiments described herein can be used by any device that processes I/O requests and manages tags for the written data. Thus, the embodiments disclosed herein are not limited to an ISA type device.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A network device interfacing with a computing system, comprising:
   a processor for generating a single input/output (I/O) command for writing data in response to an I/O request and also writing a tag that is associated with the data;
   wherein the tag includes a logical object identifier used for writing the data at a storage device and a logical address for a location at the storage device where the data is written;
   wherein the tag is stored by the network device at a memory device of the network device, while the data is stored at a local caching device, at a storage area network (SAN) storage device or both by the network device; and
   wherein the network device is an adapter having a storage protocol controller for interfacing with the SAN storage device and a controller for interfacing with the local caching device.

2. The network device of claim 1, wherein the local caching device is a solid state memory device that is managed by the network device.

3. The network device of claim 1, wherein the I/O command generated by the network device is a small computer systems interface command data block that includes a first segment and a second segment.

4. The network device of claim 3, wherein the first segment is used to store the data and the second segment is used to store the tag and the second segment further stores information regarding a logical object used for storing the tag.

5. The network device of claim 4, wherein the logical object for storing the tag is a logical unit number (LUN) used by the network device to write the tag.

6. The network device of claim 1, wherein the logical object identifier used for writing the data at the storage device identifies a logical unit number (LUN) presented to the computing system for reading and writing information.

7. A system, comprising:
   a computing device having a processor for executing an application for generating an input/output (I/O) request for writing data to a logical object presented to the application; and
   a device interfacing with the computing device having a processor for generating a single I/O command for writing data in response to the I/O request and also writing a tag that is associated with the data;
   wherein the tag includes an identifier for the logical object used for writing the data at a storage device and a logical address for a location at a storage device where the data is written;
   wherein the tag is stored at by device at a memory device of the device, while the data is stored at a local caching device, at a storage area network (SAN) storage device or both by the device; and wherein the device is an adapter having a storage protocol controller for interfacing with the SAN storage device and a controller for interfacing with the local caching device.

8. The system of claim 7, wherein the local caching device is a solid state memory device that is managed by the device.

9. The system of claim 7, wherein the I/O command generated by the device is a small computer systems interface command data block that includes a first segment and a second segment.

10. The system of claim 9, wherein the first segment is used to store the data and the second segment is used to store the tag and the second segment further stores information regarding the logical object used for storing the tag.

11. The system of claim 10, wherein the logical object for storing the tag is a logical unit number (LUN) used by the device to write the tag.

12. The system of claim 7, wherein the logical object identifier used for writing the data at the storage device identifies a logical unit number (LUN) presented to the computing system for reading and writing information.

13. A machine implemented method, comprising:
   a processor executing an application generating an input/output (I/O) request for writing data to a logical object presented to the application; and
   a device interfacing with the computing device generating a single I/O command for writing data in response to the I/O request and also writing a tag that is associated with the data;
   wherein the tag includes an identifier for the logical object used for writing the data at a storage device and a logical address for a location at the storage device where the data is written;
   wherein the tag is stored by the device at a memory device of the device, while the data is stored at a local caching device, at a storage area network (SAN) storage device or both by the device; and wherein the device is an adapter having a storage protocol controller for interfacing with the SAN storage device and a controller for interfacing with the local caching device.

14. The method of claim 13, wherein the local caching device is a solid state memory device that is managed by the device.

15. The method of claim 13, wherein the I/O command generated by the device is a small computer systems interface command data block that includes a first segment and a second segment.

16. The method of claim 15, wherein the first segment is used to store the data and the second segment is used to store the tag and the second segment further stores information regarding the logical object used for storing the tag.

17. The method of claim 16, wherein the logical object for storing the tag is a logical unit number (LUN) used by the device to write the tag.

18. The method of claim 13, wherein the logical object identifier used for writing the data at the storage device identifies a logical unit number (LUN) presented to the computing system for reading and writing information.

* * * * *